Jan. 12, 1926.

H. H. MERCER 1,569,661

VALVE MECHANISM FOR CHANNELING MACHINES

Filed May 27, 1918 — 5 Sheets-Sheet 1

Inventor:
Henry H. Mercer
by
atty.

Jan. 12, 1926.  
H. H. MERCER  
1,569,661  
VALVE MECHANISM FOR CHANNELING MACHINES  
Filed May 27, 1918  
5 Sheets-Sheet 3

Inventor:  
Henry H. Mercer.  
by  
Atty.

Jan. 12, 1926.  
H. H. MERCER  
1,569,661  
VALVE MECHANISM FOR CHANNELING MACHINES  
Filed May 27, 1918  
5 Sheets-Sheet 4
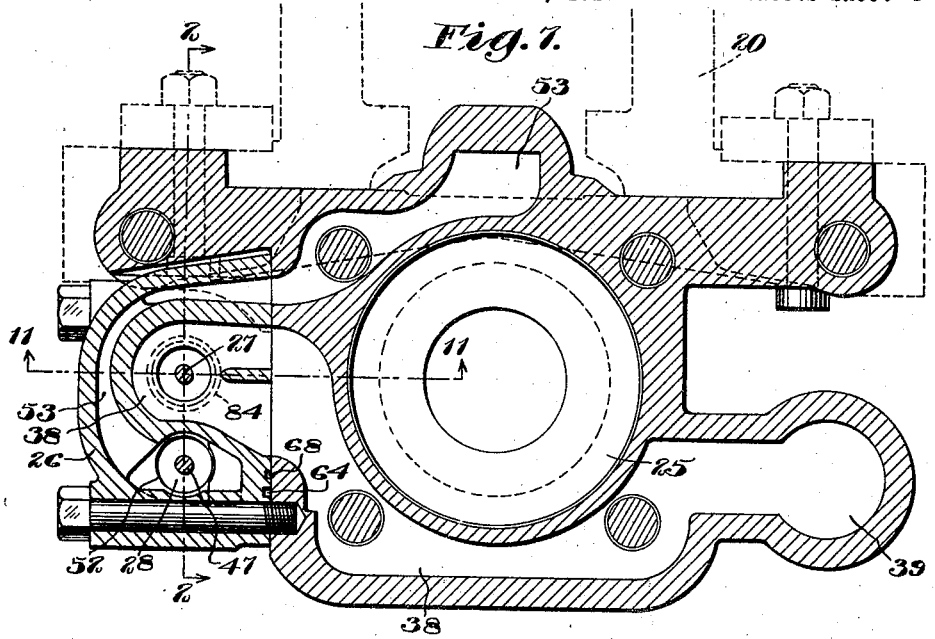
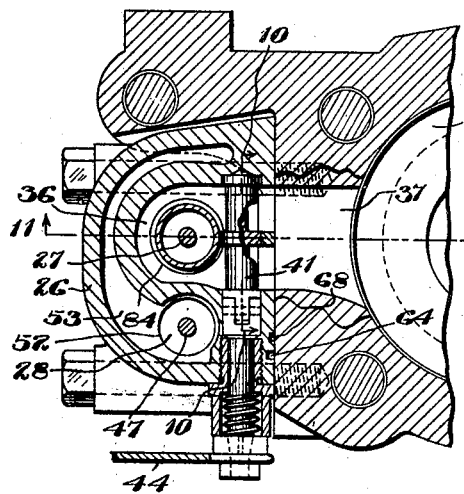
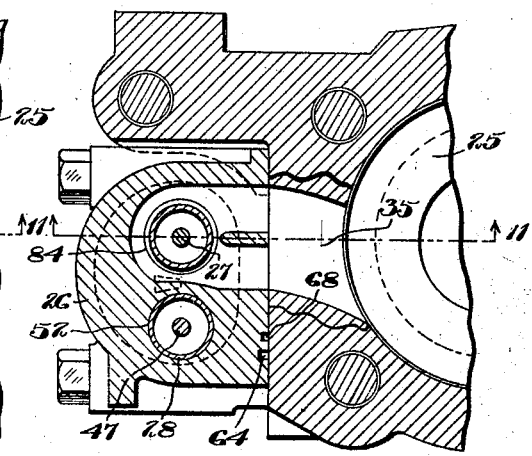
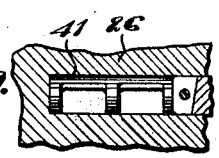
Inventor:  
Henry H. Mercer  
by  
Atty.

Jan. 12, 1926.
H. H. MERCER
VALVE MECHANISM FOR CHANNELING MACHINES
Filed May 27, 1918 5 Sheets-Sheet 5
1,569,661
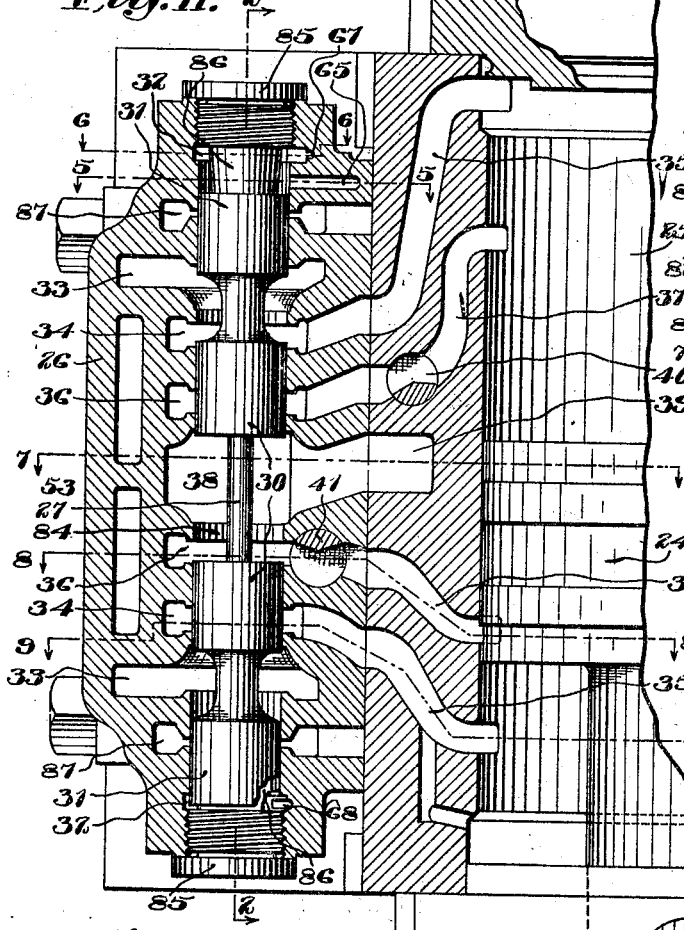
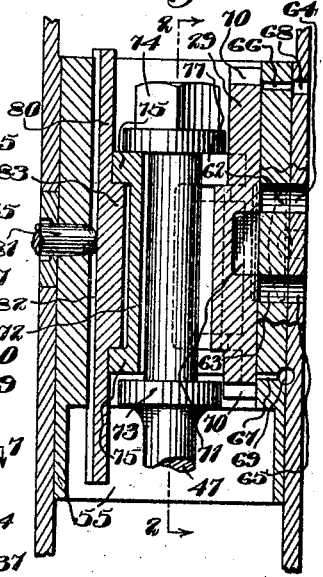
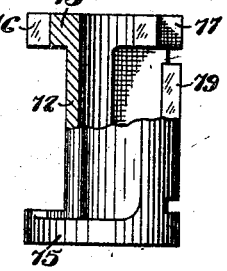
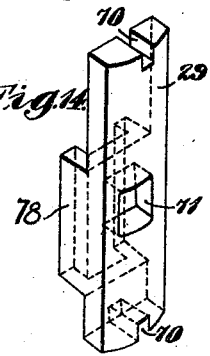
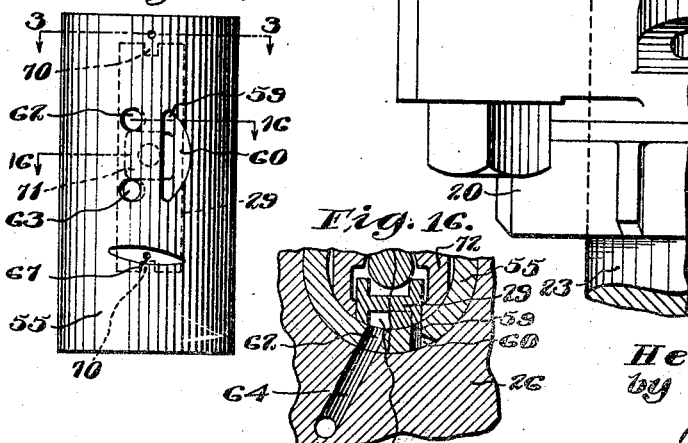
Inventor:
Henry H. Mercer
by
Mace Schull
atty.

Patented Jan. 12, 1926.

1,569,661

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

VALVE MECHANISM FOR CHANNELING MACHINES.

Application filed May 27, 1913. Serial No. 236,895.

*To all whom it may concern:*

Be it known that I, HENRY H. MERCER, a citizen of the United States, residing at Claremont, in the county of Sullivan and State of New Hampshire, have invented certain new and useful Improvements in Valve Mechanism for Channeling Machines, of which the following is a full, clear, and exact specification.

This invention relates to valve mechanism for fluid pressure engines, especially, although not exclusively, adapted for use in connection with the chopping engines of steam actuated stone channeling machines, and has for its general object the provision of improved reversing valve mechanism whereby the speed of operation of the machine is increased, this result being accompanied by a greater economy and efficiency in the utilization of the steam or other motive fluid employed.

The foregoing and other more particular objects of the invention, together with means whereby the same may be carried into effect, will best be understood from the following description of one embodiment and application thereof shown in the accompanying drawings. It will be understood, however, that the particular construction and arrangement described and shown have been chosen for illustrative purposes merely, and that said invention, as defined by the claims hereunto appended, may be otherwise embodied and applied without departing from the spirit and scope thereof.

In said drawings,—

Figure 1:
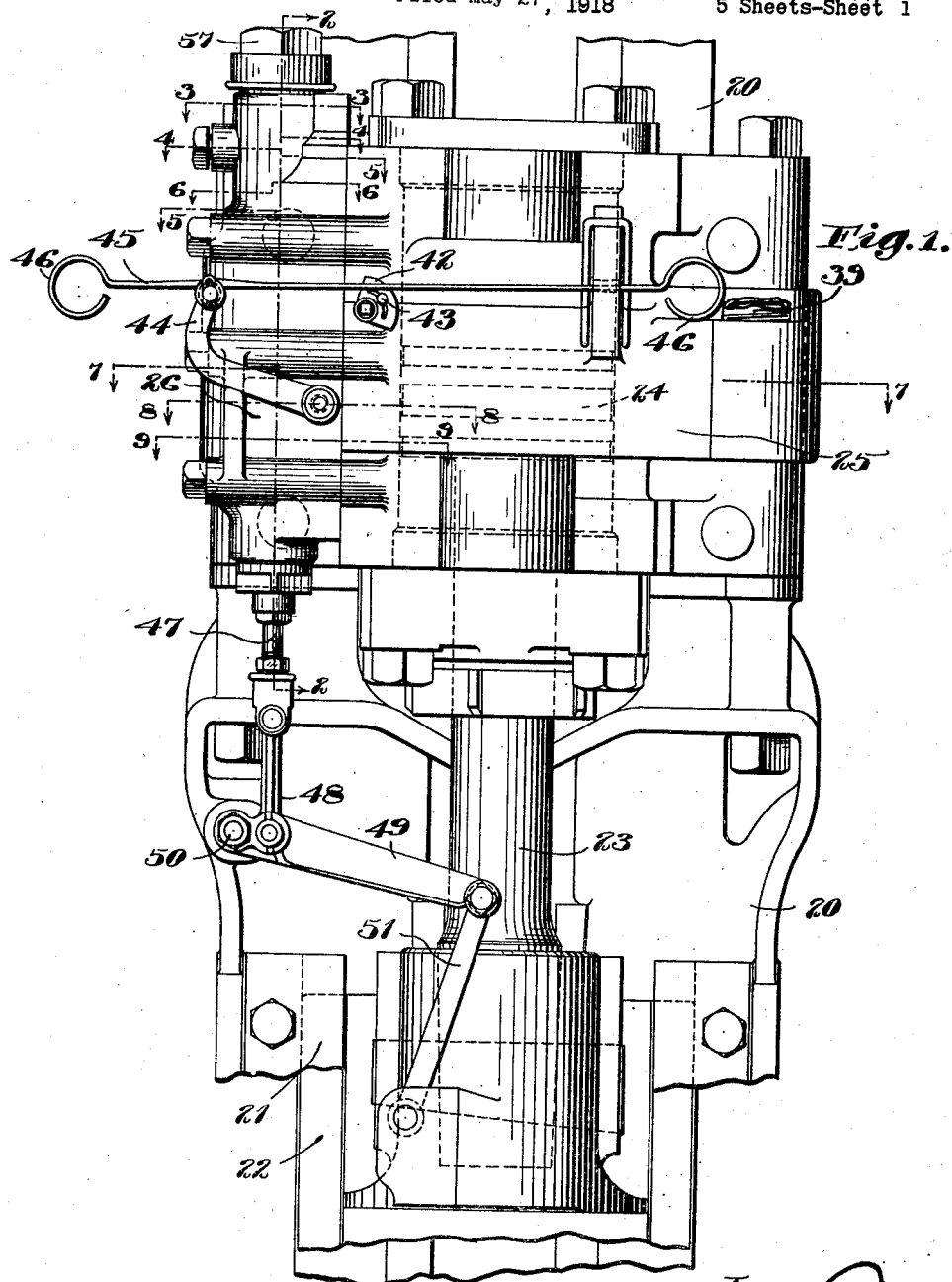
Fig. 1 is a front elevation of the head of a channeling machine constructed in accordance with the invention.
Figure 2:
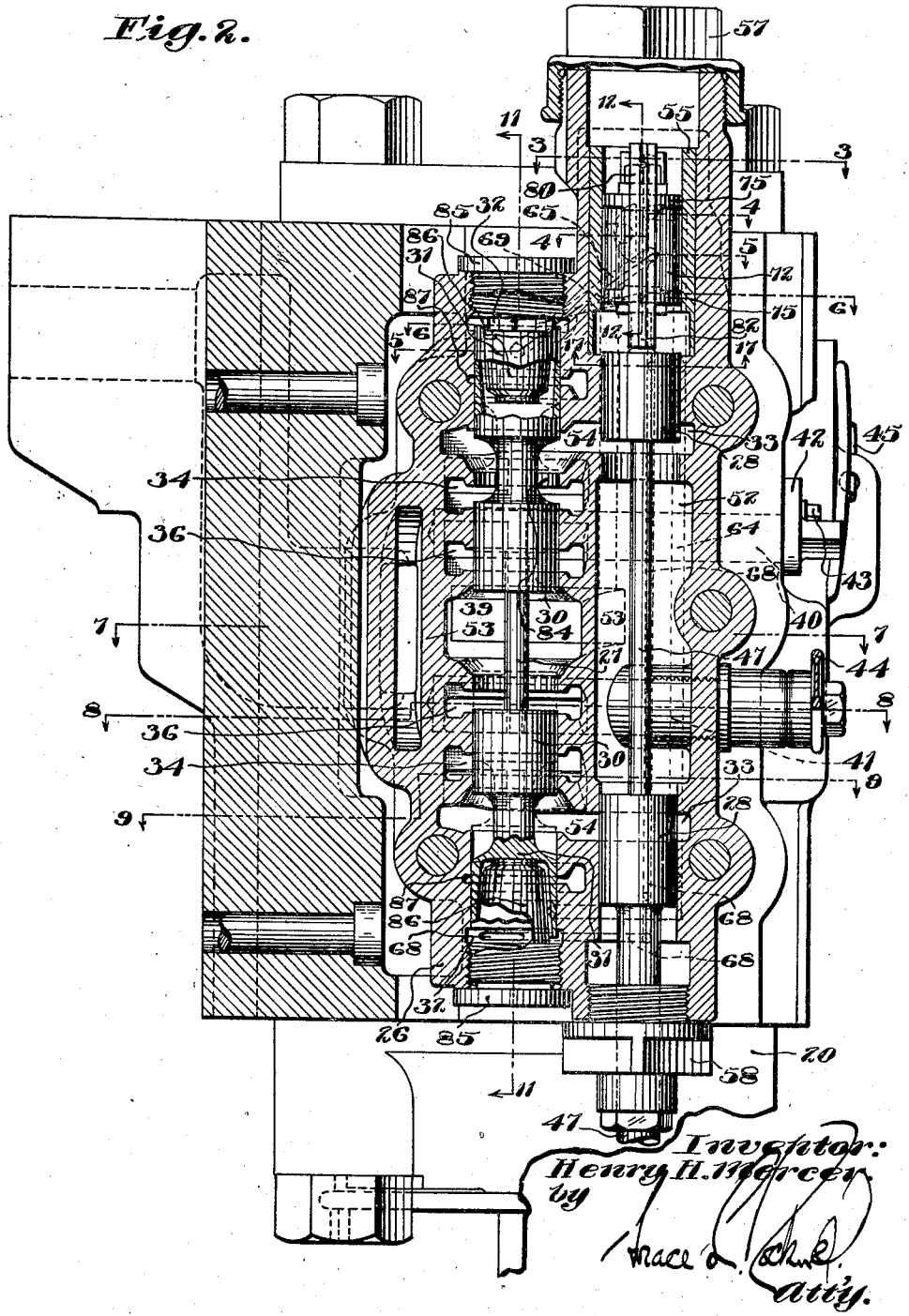
Fig. 2 is vertical section on the line 2—2, Fig. 1.
Figure 3:
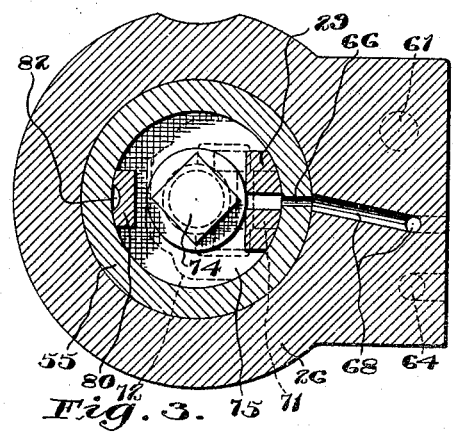
Figure 4:
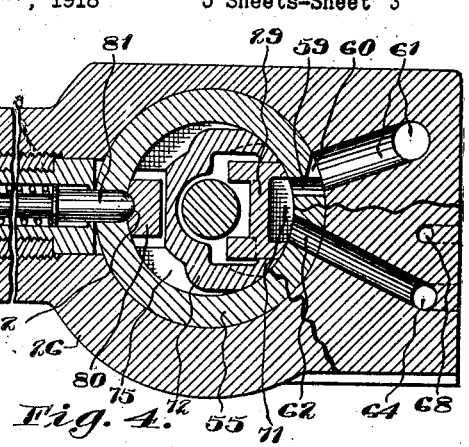
Figure 5:
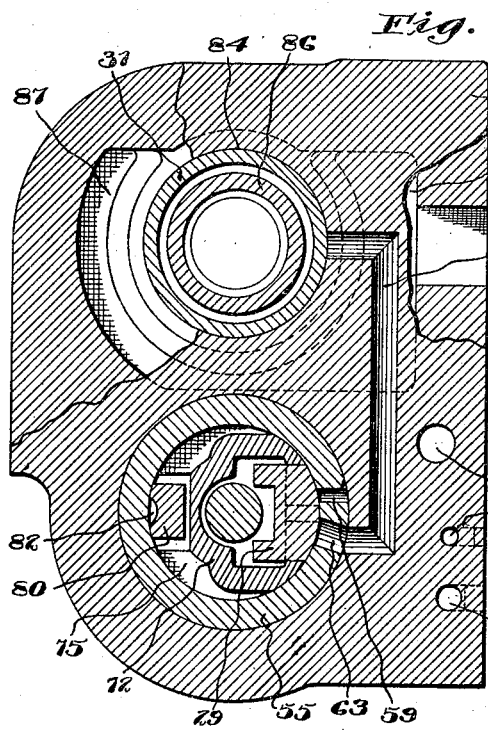
Figure 6:
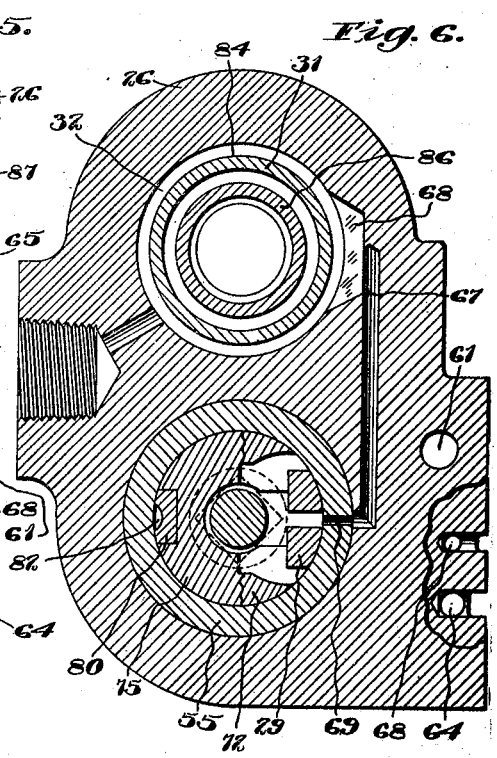

Figs. 3, 4, 5, 6, 7, 8, and 9 are horizontal sections taken substantially on the lines 3—3, 4—4, 5—5, 6—6, 7—7, 8—8, and 9—9, respectively, Figs. 1 and 2.

Fig. 10 is a detail section substantially on the line 10—10, Fig. 8.

Fig. 11 is a vertical section on the line 11—11, Fig. 2.

Fig. 12 is an enlarged vertical section on the line 12—12, Fig. 2, of the reversing valve and associated parts.

Fig. 13 is a detail elevation, partly broken away, of the reversing valve operating member or sleeve.

Fig. 14 is a detail perspective view of the reversing valve.

Fig. 15 is an elevation of the reversing valve casing, showing the reversing valve in broken lines.

Fig. 16 is a fragmentary sectional view taken substantially on the line 16—16, Fig. 15.

Figure 17:
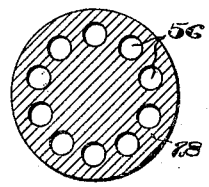

Fig. 17 is a detail section on the line 17—17, Fig. 2.

The invention is herein shown as embodied in a steam channeling machine having a standard 20 (Fig. 1) provided with guides 21 in which is slidably mounted a crosshead 22 carrying the usual gang of channeling tools (not shown). The crosshead 22 is connected by a piston rod 23 with a piston 24 (Fig. 11) in a steam or other fluid pressure cylinder 25 suitably mounted on the standard 20.

Bolted or otherwise secured to the cylinder 25 is a casing 26 containing the valve mechanism for controlling the movements of the piston 24, said valve mechanism including a fluid pressure operated distributing valve 27 for governing the admission of steam to and its exhaust from the opposite ends of the cylinder 25, cut-off valves 28 (Fig. 2) for controlling the supply of steam to the distributing valve 27, and a reversing or pilot valve 29 (Figs. 3 to 6 and 12) for controlling the movements of the distributing valve 27.

The distributing valve 27 is longitudinally movable in a valve chamber 84 in the casing 26, said valve comprising end motor piston portions 31 and intermediate piston valve portions 30. The chamber 84 comprises a vertical, substantially cylindrical bore in the casing 26, the upper and lower end portions of said bore constituting pressure chambers or motor cylinders 32 in which the pistons 31 work. The extreme ends of the chamber 84 are closed by screw caps 85 having projections 86 which enter recesses in the pistons 31, said recesses being of slightly greater diameter than said projections, the latter acting as stops to limit the outward movement of said pistons and insure the maintenance, at all times, of steam spaces at the outer ends of said pistons. The chamber 84 is formed, at different points along its length, with annular enlargements constituting upper and lower water packing grooves 87 surrounding the pistons 31, upper and lower pressure chambers 33 to which steam or other motive fluid is supplied by means hereinafter described, upper and lower inlet chambers 34 communicating through inlet passages 35 with the opposite ends of the cylinder 25, upper and lower exhaust chambers 36 communicating through exhaust passages 37 with the opposite ends of the cylinder 25, and a central discharge chamber 38 communicating with a main discharge or exhaust passage 39 leading to the atmosphere. The piston portions 30 of the distributing valve control communication between the pressure chambers 33 and the inlet chambers 34, and between the exhaust chambers 36 and discharge chambers 38. As shown in Figs. 2 and 11, the distributing valve is in a position to admit steam from the upper pressure chamber 33 to the upper inlet chamber 34 and thence through the upper inlet passage 35 to the upper end of the cylinder 25, at the same time opening communication between the lower exhaust chamber 36 and the discharge chamber 38, permitting steam to be exhausted from the lower end of the cylinder 25 through the lower exhaust passage 37, thence through the lower exhaust chamber 36 to the discharge chamber 38, and thence through the passage 39 to the atmosphere. Longitudinal movement of the valve 27 to an opposite extreme position will result in admission of steam to the lower end of the cylinder 25 and exhaust thereof from the upper end of said cylinder, as will be apparent without further explanation.

The exhaust of steam through the upper and lower exhaust passages 37 is preferably controlled by manually operated rotary exhaust valves 40 and 41, respectively, thereby affording means for cushioning the opposite strokes of the piston 24. The stem of the valve 40 is provided with a slotted segment 42 (Fig. 1) cooperating with a clamping bolt 43 in threaded engagement with the wall of the cylinder 25, whereby said valve may be angularly adjusted and secured in adjusted position according to the character of the rock being operated upon. To the stem of the valve 41 is secured a lever 44 connected to an operating rod 45 guided for longitudinal movement on the cylinder 25 and provided at its ends with handles 46 whereby the valve 41 may be conveniently adjusted from time to time in accordance with the formation encountered.

The cut-off valves 28 are mounted on or formed integral with an operating rod 47 (Fig. 2) the lower end of which is connected by a link 48 (Fig. 1) with a lever 49 pivoted at 50 to the standard 20 and connected by a second link 51 with the crosshead 22, whereby longitudinal reciprocation of said crosshead is accompanied by a corresponding longitudinal reciprocation of the rod 47. The valves 28 comprise pistons reciprocably disposed in a chamber 52 comprising a cylindrical bore in the casing 26 closed at its upper end by a suitable cap 57 and at its lower end by a stuffing box 58 through which the rod 47 passes. The chamber 52 is supplied with steam from any suitable source through an inlet passage 53, said chamber having ports 54 controlled by said valves 28 and communicating with the pressure chambers 33 of the distributing valve casing.

The reversing valve 29 (Fig. 12) is located in and cooperates with a cylindrical valve casing or bushing 55 seated in the upper end of the chamber or bore 52, the interior of said casing or bushing being supplied with steam from the lower portion of the cylinder or chamber 52 through passages 56 (see Fig. 17) in the upper cut-off valve 28. The wall of the casing or bushing 55 is formed with a discharge port comprising a longitudinally extending slot 59 communicating with a laterally disposed cavity 60 (Fig. 15) in the outer wall of said bushing, said cavity communicating with a discharge passage 61 (Fig. 4) formed in the casing 26 and communicating with the main discharge or exhaust passage 39. The valve casing 55 is also provided with a pair of exhaust ports 62 and 63 (Figs. 12 and 15) communicating, respectively, with exhaust passages 64 and 65 formed in the casing 26 and leading, respectively, to the lower and upper cylinders or pressure chambers 32 (Fig. 12.) The valve casing or bushing 55 is, further, provided with a pair of supply ports 66 and 67 communicating, respectively, with supply passages 68 and 69 leading, respectively, to the lower and upper pressure chambers 32. It will be seen that each of the cylinders or pressure chambers 32 is provided with a supply passage and a separate exhaust passage, said exhaust passages being preferably of greater cross sectional area than said supply passages.

The reversing valve 29 is formed at its ends with notches 70 (Figs. 12 and 14) adapted, as said valve is moved longitudinally in the casing or bushing 55, to open the supply ports 66 and 67 alternately. Said valve 29 is further provided between its ends with a cavity 71 (Figs. 4, 12, 14, 15, and 16) adapted to place the exhaust ports 62 and 63 alternately in communication with the slot or discharge port 59. In one longitudinal position of the valve, the supply port 67 is closed and the supply port 66 opened, while the exhaust port 62 is closed and the exhaust port 63 placed in communication, through the cavity 71, with the discharge port 59, thereby admitting fluid pressure through the passage 68 to the lower cylinder 32, exhausting fluid pressure from the upper cylinder through the outlet passage 65, and causing an upward movement of the distributing valve 27. In another longitudinal position of the valve 29, the supply port 66 is closed and the supply port 67 opened, while the exhaust port 63 is closed and the exhaust port 62 placed in communication with the discharge port 59, thereby admitting fluid pressure to the upper cylinder 32, while exhausting pressure from the lower cylinder 32 and causing a downward movement of the distributing valve 27.

For operating the reversing valve 29, the following connections are provided. Loosely mounted on the rod 47 is a sleeve 72, said sleeve being longitudinally positioned by a flange or collar 73 and a nut 74 on said rod at opposite ends, respectively, of said sleeve, the spacing of said flange and nut being preferably such as to permit a slight amount of lost motion between said sleeve and rod. The sleeve 72 is provided at its ends with flanges 75 having notches 76 and 77. The notches 77 receive the valve 29, the sides of said notches engaging lateral faces on said valve, while the adjacent portions of the flanges 75, which extend transversely of the valve, engage the ends of a projection 78 formed on the rear side of said valve, the lateral faces of said projection being engaged by flanges or ribs 79 formed on said sleeve. It will thus be seen that, by reason of the interengaging projections on the sleeve and valve, said valve is caused to move longitudinally with said sleeve, and is held against lateral or angular movement with respect thereto, the connection between said parts, however, being sufficiently loose to permit said valve to seat itself freely upon the inner face of the casing or bushing 55 under the influence of the fluid pressure in said bushing. The notches 76 in the flanges 75 receive a slide 80 which is guided for longitudinal movement in the bushing 55 by means of a pin or stud 81 extending through the wall of said bushing and engaging a longitudinal slot 82 formed in the outer face of said slide. Said slide 80 is provided at its inner side with a projection 83 engaged at its ends by the flanges 75, whereby said slide 80 is caused to move longitudinally with said sleeve, said parts being held against relative lateral or angular movement by engagement of the walls of the notches 76 with the lateral faces of the slide. The sleeve 72 is therefore angularly positioned by the slide 80 and acts, in turn, to angularly position the valve 29, thereby causing the notches 70 and cavity 71 of the latter to register properly with the several ports in the bushing 55.

From the foregoing it will be seen that fluid pressure is admitted to and exhausted from each of the pressure chambers or cylinders 32 through separate passages, so that said fluid, in flowing into and out of said chambers or cylinders, always flows in the same direction through the same passage and is not obliged to reverse its direction of flow in any passage, thereby avoiding any retardation due to such reversal. As a result of this provision, it has been found by experiment that the number of blows struck by the channeling tools is increased by approximately fifty per minute.

It will also be seen that the provision of separate inlet and exhaust passages for the pressure chambers makes it possible to employ passages of different sizes for the inlet and exhaust, respectively, thereby decreasing the quantity of steam consumption, since a relatively small passage may be employed for admitting the live steam and a larger passage provided for rapidly exhausting said steam after its expansion, so that these passages may be relatively designed to provide for the admission of only the requisite amount of live steam to produce the desired movement, while permitting the exhaust of the expanded steam at maximum velocity and without the creation of back pressures.

While I have in this application specifically described one embodiment which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination with a cylinder, a piston therein, and fluid pressure operated distributing valve mechanism for controlling the movements of said piston in said cylinder, of a valve chamber having a single discharge port, a plurality of exhaust ports communicating with said valve mechanism, and opening into said valve chamber at points between the extreme limits of said discharge port and a plurality of supply ports communicating with said valve mechanism, means for supplying fluid pressure to said valve chamber, and a reversing valve in said chamber and movable into successive positions therein, said valve in each position closing one of said supply ports and one of said exhaust ports, while opening another of said supply ports and placing another of said exhaust ports in communication with said discharge port.

2. The combination with a cylinder, a piston therein, and a distributing valve for controlling the movements of said piston in said cylinder, of fluid pressure means for operating said distributing valve including a plurality of pressure chambers, a valve chamber having a single discharge port, supply ports communicating with each of said pressure chambers, and exhaust ports communicating with each of said pressure chambers and opening into said valve chamber at one side of said discharge port, means for supplying fluid pressure to said valve chamber, and a reversing valve in said valve chamber and movable into successive positions therein, said valve in each position closing the exhaust port and opening the supply port communicating with one of said chambers, while closing the supply port communicating with another of said chambers and placing the exhaust port communicating with said last named chamber in communication with said discharge port.

3. The combination with a valve casing having opening thereinto an elongated discharge port, a pair of exhaust ports located at one and the same side of said discharge port and a pair of spaced supply ports, the interior of said casing being in communication with a source of fluid pressure, of a valve in said casing adapted to uncover said supply ports alternately, said valve having a cavity adapted to place said exhaust ports alternately in communication with said discharge port.

4. The combination with a valve casing having an elongated discharge port, a pair of exhaust ports located at one and the same side of said discharge port, and a pair of supply ports, the interior of said casing being in communication with a source of fluid pressure, of a valve in said casing having notched ends adapted to open said supply ports alternately, said valve having a cavity adapted to place said exhaust ports alternately in communication with said discharge port.

5. The combination with a valve casing having a wall provided with an elongated discharge port and a pair of exhaust ports located at one and the same side of said discharge port, the outer face of said wall having a cavity communicating with said discharge port and extending laterally therefrom, of an exhaust conduit communicating with said cavity, and a valve in said casing having a cavity adapted to place said exhaust ports alternately in communication with said discharge port.

6. The combination with a valve casing having ports, of a valve in said casing for controlling said ports, an operating rod for said valve, and a sleeve mounted on said rod, said sleeve and valve having interengaging projections.

7. The combination with a valve casing having ports, of a valve in said casing for controlling said ports, an operating rod for said valve, and a hollow sleeve having its interior open to steam pressure mounted on said rod, said sleeve having laterally arranged projections engaging lateral faces on said valve and transversely extending projections, and said valve having on its rear side a projection engaged at its ends by the transversely extending projections on said sleeve.

8. The combination with a valve casing having ports, of a valve in said casing for controlling said ports, an operating rod for said valve, a hollow sleeve having its interior open to steam pressure loosely mounted on said rod, said sleeve and valve having interengaging projections, and means for guiding said sleeve in said valve casing.

9. The combination with a valve casing having ports, of a valve in said casing for controlling said ports, an operating rod for said valve, a hollow sleeve having its interior open to steam pressure loosely mounted on said rod, said sleeve and valve having interengaging projections, and a slide guided in a predetermined path in said valve casing, said slide and sleeve having interengaging projections.

10. The combination with a valve casing having ports, of a valve in said casing for controlling said ports, an operating rod for said valve, a hollow sleeve having its interior open to steam pressure loosely mounted on said rod, said sleeve and valve having interengaging projections, and a slide guided in a predetermined path in said valve casing, said sleeve having laterally arranged projections engaging lateral faces on said slide and transversely extending projections, and said slide having a projection engaged at its ends by the transversely extending projections on said sleeve.

11. The combination with a cylindrical valve casing having ports, of a valve in said casing for controlling said ports, an operating rod for said valve, a sleeve loosely mounted on said rod and having its interior open to steam pressure, and a slide guided in said valve casing, said sleeve having end flanges notched to receive said valve and slide, and said valve and slide having projections engaged at their ends by said flanges.

12. The combination with a valve casing having an elongated discharge port, a pair of exhaust ports located at one side of said discharge port, and a pair of supply ports, the interior of said casing being in communication with a source of fluid pressure, of a valve in said casing adapted to open said supply ports alternately, said valve having a cavity adapted to place said exhaust ports alternately in communication with said discharge port, an operating rod for said valve, a hollow sleeve having its interior open to steam pressure loosely mounted on said rod, said sleeve and valve having interengaging projections, and means for guiding said sleeve in said valve casing.

13. In a steam engine, a valve mechanism comprising a valve seat having a centrally arranged discharge port, distribution ports disposed respectively adjacent the opposite ends of said discharge port and communicating with the opposite ends of said cylinder, exhaust passages communicating with the opposite ends of the cylinder and opening through said valve seat at points to one side of and between the ends of said discharge port, and a valve cooperating with said ports and operative to open one of said distribution ports while placing the exhaust passage remote therefrom in connection with said discharge port.

14. Fluid exhaust mechanism comprising a valve chest and a valve reciprocable therein, said valve chest being provided with a port elongated in the direction of valve travel and communicating with a point of discharge and being also provided with ports arranged respectively at opposite sides of a line dividing said first mentioned port transversely and between such line and parallel lines arranged at the extreme ends of said first mentioned port, and said valve being provided with a cavity adapted to connect said second mentioned ports alternately but not simultaneously with said first mentioned port.

15. Fluid exhaust mechanism comprising a valve chest providing a chamber in which a valve may move, a valve in said chamber, said valve chest having opening into the interior thereof a port of substantial length so that its ends are spaced a substantial distance from each other, said valve being provided with a recess cooperating with said port and the movement of said recess on movement of the valve being in a direction transverse to the ends of the port, there being a plurality of ports opening into said valve chamber at points adjacent but between the opposite ends of said first mentioned port and said valve operating to connect said last mentioned ports alternately with said first mentioned port by means of said recess.

16. In a valve mechanism for alternately supplying and discharging fluid from the opposite ends of a chamber, a valve chest, a fluid supply connection thereto, passages of relatively small diameter communicating with the ends of said chamber and with the interior of said valve chest at spaced points, passages of larger diameter communicating at their opposite ends respectively with the opposite ends of said chamber at points more closely adjacent each other than said first mentioned passages and with said valve chest at spaced points, an exhaust connection communicating with said valve chest through a port whose opposite ends are spaced apart a distance substantially equal to the extreme distance between the remote points of communication with the valve chest of said exhaust passages, and a D-type slide valve having a recess alternately connecting said second mentioned passages with said exhaust port and also having notched ends alternately uncovering said first mentioned passages.

In testimony whereof I affix my signature.

HENRY H. MERCER.